(12) United States Patent
Wang et al.

(10) Patent No.: US 9,709,210 B2
(45) Date of Patent: Jul. 18, 2017

(54) SUPPORT DEVICE, DISPLAY DEVICE

(71) Applicant: BOE TECHNOLOGY GROUP CO., LTD., Beijing (CN)

(72) Inventors: Zifeng Wang, Beijing (CN); Yan Ren, Beijing (CN); Yue Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 17 days.

(21) Appl. No.: 14/436,226

(22) PCT Filed: Sep. 26, 2014

(86) PCT No.: PCT/CN2014/087595
§ 371 (c)(1),
(2) Date: Apr. 16, 2015

(87) PCT Pub. No.: WO2015/180333
PCT Pub. Date: Dec. 3, 2015

(65) Prior Publication Data
US 2016/0178113 A1   Jun. 23, 2016

(30) Foreign Application Priority Data

May 29, 2014  (CN) .................... 2014 2 0283006 U

(51) Int. Cl.
*F16L 3/00*   (2006.01)
*F16M 11/22*  (2006.01)
(Continued)

(52) U.S. Cl.
CPC ............. *F16M 11/22* (2013.01); *F16M 11/16* (2013.01); *H05K 5/0017* (2013.01)

(58) Field of Classification Search
USPC ........................................................ 248/121
See application file for complete search history.

(56) References Cited

U.S. PATENT DOCUMENTS 7,529,082 B2 *  5/2009  Maruta .................... G06F 1/16
                                                          248/121
7,742,288 B2 *  6/2010  Min ....................... F16M 11/00
                                                          248/125.8
(Continued)

FOREIGN PATENT DOCUMENTS

CN        201225495 Y       4/2009
CN        201925681 U       8/2011
(Continued)

OTHER PUBLICATIONS

International Search Report of PCT/CN2014/087595 in Chinese, mailed Jan. 8, 2015 with English translation.
(Continued)

*Primary Examiner* — Monica Millner
(74) *Attorney, Agent, or Firm* — Collard & Roe, P.C.

(57) ABSTRACT

A support device (01) comprises a base (10) and at least one support member (20) disposed on an upper surface of the base (10), the support member (20) each at least comprises a support portion (210) contacting a back shell to be supported. The support portion (210) comprises: a contact surface (211) facing the back shell; the contact surface (211) comprising a first subarea (211a) parallel with a plane where the back shell is located and a second subarea (211b) which intersects a side, away from the upper surface, of the first subarea (211a), and the second subarea (211b) being angled in a direction away from the plane where the back shell is located; and a first retainer portion (212) disposed at a position where the first subarea (211a) intersects the second subarea (211b), and a second retainer portion (213) disposed at the second subarea (211b). The support device (01) may reduce the forward/downward inner stress of the back shell per se and improve the stability and strength of the overall structure of the back shell.

20 Claims, 6 Drawing Sheets

(51) Int. Cl.
*H05K 5/00* (2006.01)
*F16M 11/16* (2006.01)

(56) References Cited

U.S. PATENT DOCUMENTS

| | | | |
|---|---|---|---|
| 2004/0052038 A1* | 3/2004 | Wu ........................ | F16M 11/00 361/679.21 |
| 2005/0050784 A1* | 3/2005 | Bang ...................... | F16M 11/00 40/607.01 |
| 2007/0080270 A1* | 4/2007 | Choi ....................... | F16M 11/00 248/188.8 |
| 2007/0210220 A1* | 9/2007 | Sawai ..................... | F16M 11/10 248/122.1 |
| 2008/0093515 A1* | 4/2008 | Makino .................. | F16M 11/10 248/176.1 |
| 2009/0086119 A1* | 4/2009 | Hiradate ............... | H05K 5/0217 349/58 |
| 2009/0095870 A1* | 4/2009 | Chang .................... | F16M 11/00 248/440 |
| 2010/0065695 A1* | 3/2010 | Fujikawa ............... | F16M 11/00 248/121 |
| 2011/0073738 A1* | 3/2011 | Takao .................... | F16M 11/00 248/397 |
| 2013/0155587 A1* | 6/2013 | Take ...................... | H05K 5/0204 361/679.01 |
| 2013/0155655 A1* | 6/2013 | Lee ......................... | H05K 5/03 362/97.1 |
| 2014/0239133 A1* | 8/2014 | Burns .................... | F16M 11/04 248/121 |

FOREIGN PATENT DOCUMENTS

| | | |
|---|---|---|
| CN | 202252697 U | 5/2012 |
| CN | 202484545 U | 10/2012 |
| CN | 203297883 U | 11/2013 |
| JP | 2008-115973 A | 5/2008 |
| WO | 2015/180333 A1 | 12/2015 |

OTHER PUBLICATIONS

Notice of Transmittal of the International Search Report and Written Opinion of PCT/CN2014/087595 in Chinese, mailed Jan. 8, 2015.
Written Opinion of the International Searching Authority with Notice of Transmittal of the International Search Report and Written Opinion of PCT/CN2014/087595 in Chinese, mailed Jan. 8, 2015 with English translation.

* cited by examiner

16
SUPPORT DEVICE, DISPLAY DEVICE

CROSS REFERENCE TO RELATED APPLICATIONS

This application is the National Stage of PCT/CN2014/087595 filed on Sep. 26, 2014, which claims priority under 35 U.S.C. §119 of Chinese Application No. 201420283006.X filed on May 29, 2014, the disclosure of which is incorporated by reference.

TECHNICAL FIELD

Embodiments of the present disclosure relate to a support device and a display device.

BACKGROUND

In a display device, a back shell is required to carry corresponding display unit and circuitry, and also to support some assorting structures matching with the display unit and circuitry. Accordingly, the back shell is such a structure of great importance in a display device, and the structural stability and strength of the back shell can affect the appearance and reliability of the entire display device.

Due to the development that the overall structure of the display device increasingly becomes large-sized and ultra-thin, correspondingly, the overall thickness of the back shell is getting thinner, and the dimension of the back shell is also becoming greater. In such a situation, the structural stability and overall strength of the back shell are reduced, thus the back shell is readily subjected to curling and denting, and this can influence the appearance and reliability of the display device.

SUMMARY

Embodiments of the present disclosure provides a support device and a display device, and the support device can reduce the forward/downward inner stress of the back shell per se and thus improve the stability and strength of the overall structure of the back shell.

At least one embodiment of the present disclosure provides a support device, which comprises: a base and at least one support member disposed on an upper surface of the base; the support member each at least comprises a support portion contacting a back shell to be supported. The support portion comprises: a contact surface which faces the back shell and comprises a first subarea parallel with a plane where the back shell is located and a second subarea intersecting a side, away from the upper surface, of the first subarea, the second subarea being angled in a direction away from the plane where the back shell is located; and a first retainer portion disposed at a position where the first subarea intersects the second subarea, and a second retainer portion disposed at the second subarea.

At least one embodiment of the present disclosure also provides a display device which comprises a back shell and the support device according to the above embodiment; and the back shell comprises a first stopper portion corresponding to the first retainer portion of the support device, and a second stopper portion corresponding to the second retainer portion of the support device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

01—support device; 02—locking screw hole; 03—back shell; 10—base; 110—upper surface; 20—support member; 210—support portion; 211—contact surface; 211a—first subarea; 211b—second subarea; 212—first retainer portion (positioning hole); 212—second retainer portion (positioning hole); 214—concave portion; 215—strengthening rib; 216—first lateral surface; 217—second lateral surface; 220—support pole; 230—connecting portion.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
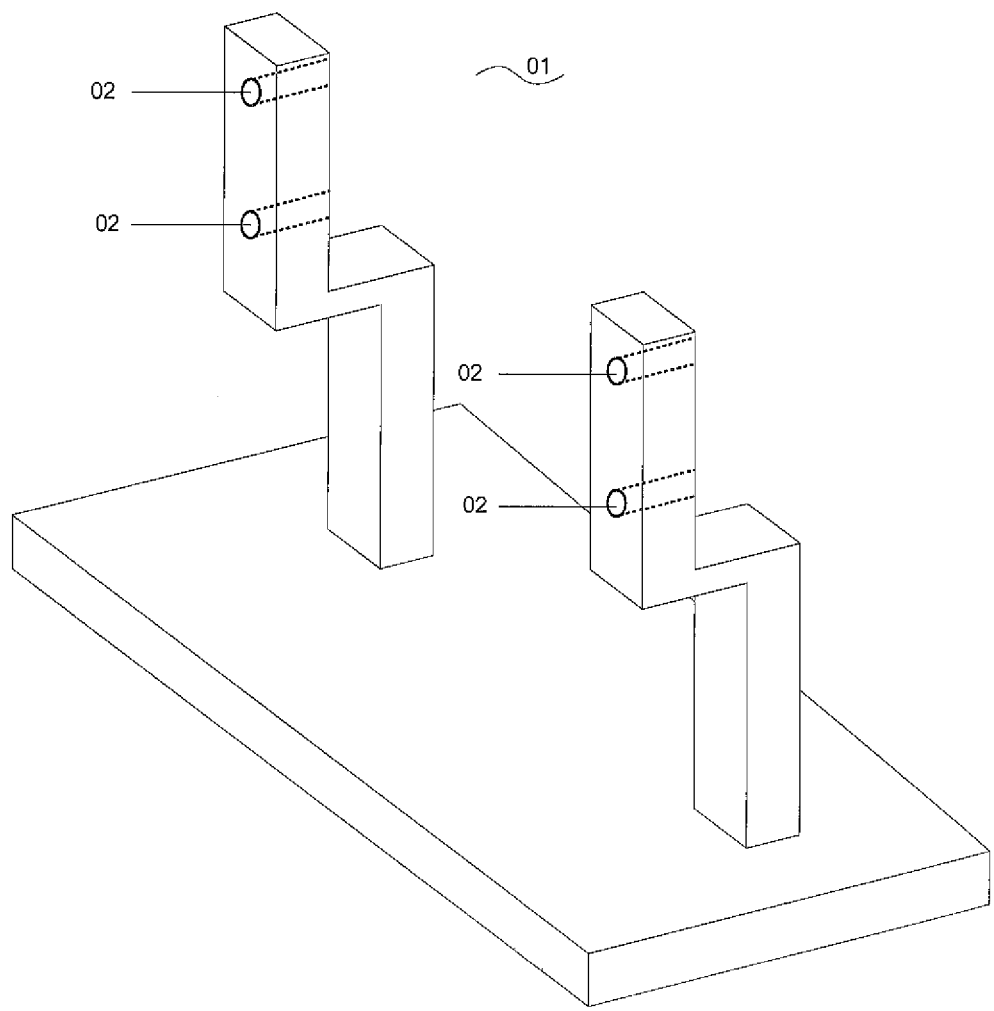
FIG. 1 is a structural schematic view of a support device.
Figure 2A:
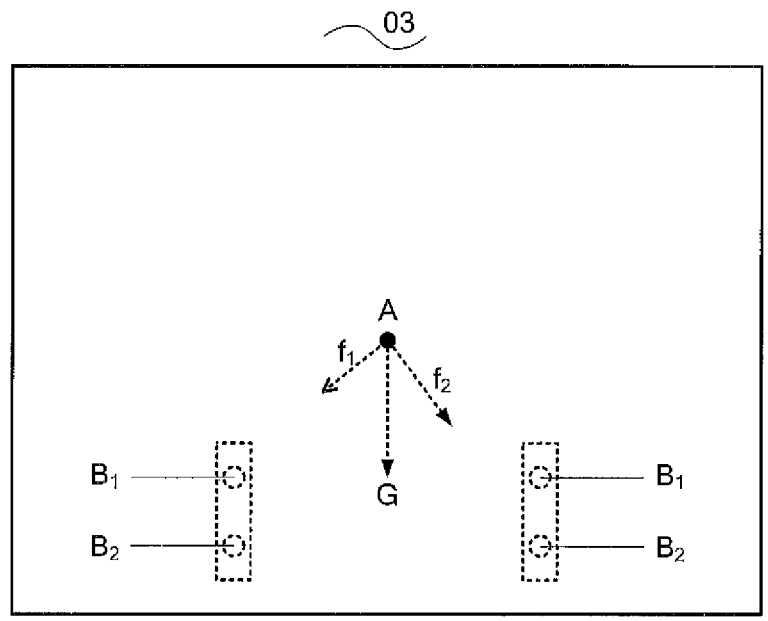
FIG. 2(a) is a rear view illustrating stress analysis of the back shell corresponding to the support device of FIG. 1.
Figure 2B:
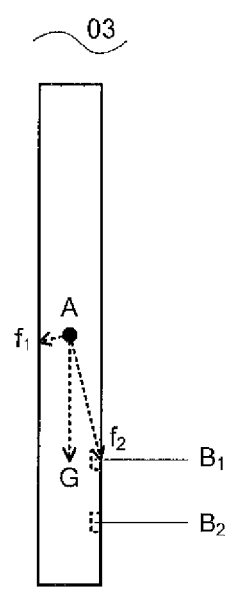
FIG. 2(b) is a side view illustrating stress analysis of the back shell corresponding to the support device of FIG. 1.

As shown in FIG. 1, locking screw holes 02 in a support device 01 of a back shell and corresponding locking screws are used for fastening and supporting the back shell and corresponding parts carried by the back shell. Accordingly, as shown in FIGS. 2(a) and 2(b), the region where the back shell 03 contacts the support device 01 shown in FIG. 1 is indicated by the dashed boxes in FIGS. 2(a) and 2(b). Fulcrums can be produced on the back shell 03 at positions corresponding to the locking screws. An optional mass point A on the back shell is chosen as an analysis object, for example, one of the fulcrums in a direction away from the ground is defined as a stress point (indicated by B1 in the figures), and one of the fulcrums in a direction close to the ground is defined as a supporting point (indicated by B2 in the figures).

It can be seen from FIG. 2(a) that due to that the mass point A is subjected to a downward gravity force G, the gravity force G may be resolved into two component forces f1 and f2 with respect to the direction of the supporting point B2 and its perpendicular direction, respectively. The component force f1 can generate a moment, which causes a tendency of downward rotation. In a similar way, it can be seen from FIG. 2(b) that, the component force f1 produced by the gravity force G subjected by the mass point A can also produce a moment, which causes a tendency of forward rotation for the entirety of the back shell.

Figure 3:
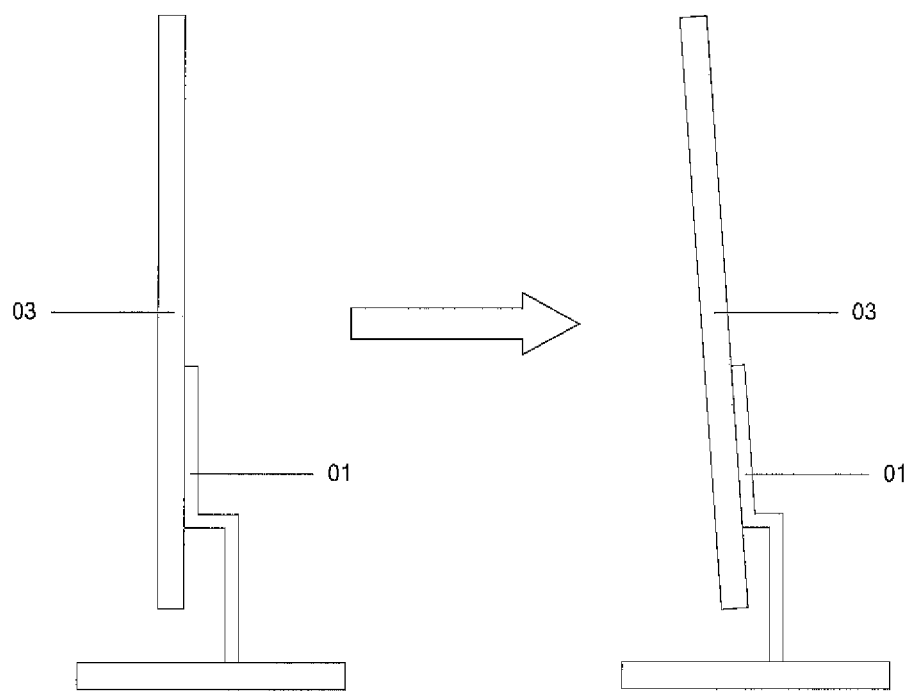
FIG. 3 is a schematic view illustrating variation of overall deformation of a display device.

In view of this, an analysis may be made that the entire back shell is subjected to a forward/downward inner stress with respect to the supporting point B2, moreover, as the dimension of the back shell increases and the thickness gets thinner, the inner stress subjected by the interior of the back shell increases synchronously. As shown in FIG. 3, as the service time of the display device increases, the material can be gradually aged under the continuous action of the inner stress of the back shell 03, and thus the back shell 03 can occur inward dent deformation; moreover, referring to FIG. 1, due to the contact between the back shell and the support device, the inner stress within the back shell can act on the support device through the contact, in such a way that the support device is subjected to a downward/forward stress and thus generates a forward tipping tendency together with the back shell, and this has a strong impact on the display quality.

To solve the above problems, more expensive high-strength materials may be adopted so as to depress the effect of stress concentration inside the back shell, but the cost for the raw materials and corresponding manufacture and processing of the back shell is increased greatly.

Hence, the inventor noted that how to maintain the steadiness and strength of the overall structure of a large-sized and ultra-thin back shell is a problem eager to be solved by the skilled in this art.

Figure 4:
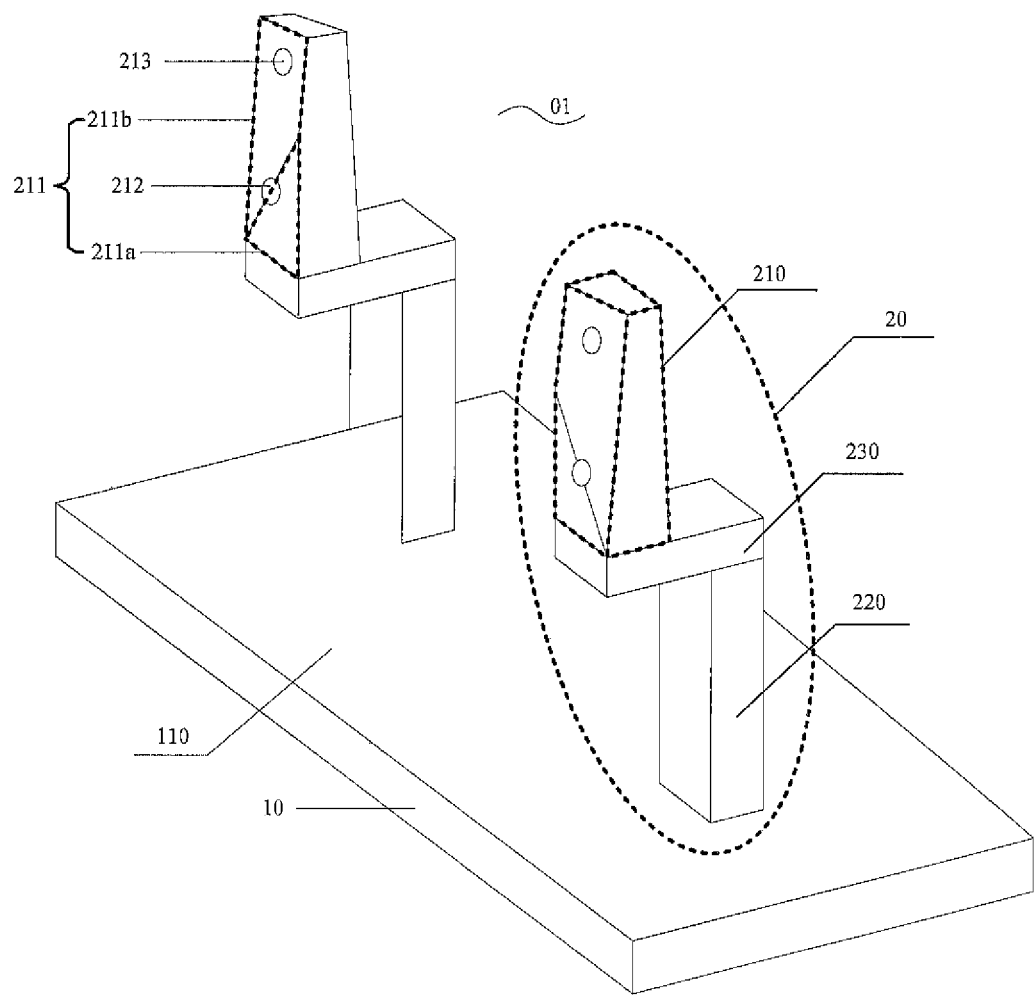
FIG. 4 is a structural schematic view of a support device provided by an embodiment of the present disclosure.

At least one embodiment of the present disclosure provides a support device 01, as shown in FIG. 4. The support device 01 comprises a base 10 and at least one support member 20 located on an upper surface 110 of the base 10; and the support member 20 each at least comprises a support portion 210 contacting a back shell to be supported.

The support portion 210 comprises a contact surface 211 facing the back shell; and the contact surface 211 comprises a first subarea 211a parallel with the plane where the back shell is located and a second subarea 211b intersecting a side, away from the upper surface, of the first subarea 211a, and the second subarea 211b is angled in a direction away from the plane where the back shell is located. The support portion 210 further comprises a first retainer portion 212 disposed at a position where the first subarea 211a intersects the second subarea 211b, and a second retainer portion 213 disposed at the second subarea 211b.

It is to be noted that, firstly, the embodiments of the present disclosure does not restrict the range of the angle formed due to that the second subarea 211b is angled in the direction away from the back shell, and this angle can be correspondingly regulated according to the stress intensity produced by the material used for the support member 20.

Secondly, in the support device 01, the base 10 is usually placed on a planar article, for example, the upper surface of a desk. Therefore, the support member 20 can be provided to be perpendicular to the upper surface 110 of the base 10, for example, in such a way that the entirety of the support member 20 is even more fixe.

The first retainer portion 212 and the second retainer portion 213 are used for connecting the support portion 210 with the back shell to be fixed, so that with the support device 01, the back shell as well as the display unit, circuitry, and assorting structures and the like which are carried by the back shell are firmly arranged on a flat face.

Accordingly, the first retainer portion 212 is located at the intersection portion of the first subarea 211a and the second subarea 211b so as to provide such an effect that after the first subarea 211a contacts the back shell, a certain supporting force can also be provided so that the second subarea 211b is distorted so as to contact the back shell through the second retainer portion 213.

Before the support portion 210 is fixed with the back shell through the first retainer portion 212 and the second retainer portion 213, the first subarea 211a contacts the back shell to be fixed, that is, the first subarea 211a is perpendicular to the upper surface 110. Correspondingly, the second subarea 211b does not contact the back shell and there is a certain gap between the second subarea and the back shell, that is, the second subarea 211b is angled in a direction away from the plane where the back shell is located.

In this way, on one hand, by fastening the first subarea 211a with the back shell using the first retainer portion 212, the first subarea 211a can provide a certain supporting force for the back shell; on the other hand, the second retainer portion 213 can be utilized to distort the second subarea 211b until the second subarea 211b contacts the back shell, so that the second subarea 211b and the back shell contact with each other and are fixed together. Due to the fact that before the fastening, there is a certain gap between the second subarea 211b and the back shell, after the second subarea 211b is distorted so as to contact the back shell, the inner of the second subarea 211b of the support portion 210 can generate an inner stress opposite to the distorting direction, i.e., the second subarea 211b has a tendency of rebounding backwardly (i.e., in a direction away from the back shell) and upwardly, so that the entirety of the support portion 210 can generate an inner stress opposite to the direction of the downward/forward inner stress of the back shell, so as to slow down the downward/forward (i.e., a direction facing the display) pitch tendency caused by the downward/forward inner stress in the back shell, which may improve the stability and strength of the overall structure of the back shell, thereby ensuring the smoothness of the overall back shell.

On the other hand, by adopting the support device 01 provided by the embodiments of the present disclosure, the forward/downward inner stress of the back shell per se can be reduced, and the stability and strength of the overall structure of the back shell can be improved, so there is no need of selecting an expensive high-strength material to manufacture the back shell, and this reduces the cost of manufacturing the back shell used in a large sized and ultrathin display device.

Further, as shown in FIG. 4, the first retainer portion 212 comprises a first positioning hole and a first aligning member corresponding to the first positioning hole; and the second retainer portion 213 comprises a second positioning hole and a second aligning member corresponding to the second positioning hole.

It is to be noted that, firstly, FIG. 4 merely schematically illustrates the first positioning hole of the first retainer portion 212, and the first aligning member of the first retainer portion 212 is not shown. Moreover, for brevity, the first positioning hole is similarly marked as 212; and the second retainer portion 213 is handled in a similar way, and detailed description thereof is omitted herein.

Secondly, the first positioning hole 212 and the second positioning hole 213 may be screw holes, for example; correspondingly, the first aligning member and the second aligning member may be screws, for example; and embodiments of the present disclosure herein have no restriction in this respect, as long as it's possible to achieve the connection between the support portion 210 and the back shell so as to fasten and support the back shell.

Figure 5:
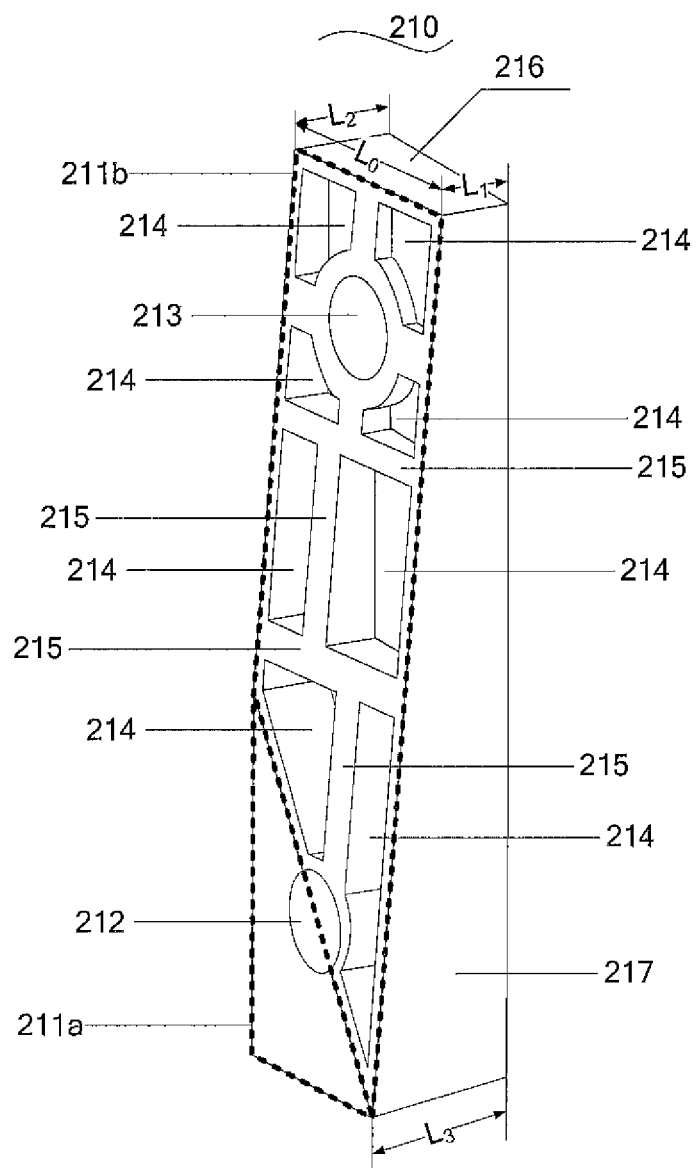
FIG. 5 is a structural schematic view of a support portion in a support device provided by an embodiment of the present disclosure.

Based on the above embodiments, as shown in FIG. 5, the support portion 210 further comprises a plurality of concave portions 214 disposed in the second subarea 211b, and the openings of the concave portions 214 face the back shell; and the support portion 210 further comprises a plurality of strengthening ribs 215 connecting the adjacent concave portions 214.

Here, the concave portions 214 act to facilitate the second subarea 211b being distorted to contact the back shell through the second aligning member.

The provision of the above-mentioned plurality of concave portions 214 behaves as decreasing the dead weight of the support portion 210, however, it may occur that the support portion 210 (that is, the structure) has an oversized suspending face or span, and this can decrease the load carrying capacity of the second subarea 211b of the support portion 210 and thus is adverse to fixing the back shell; accordingly, the plurality of strengthening ribs 215 which respectively connect and are disposed between adjacent concave portions 214 can not only improve the strength of the second positioning hole 213, but also prevent the stress yield of the materials when the second subarea 211b of the support portion 210 occurs distortion, and thus facilitate the second subarea 211b to distort in a direction close to the back shell.

It is to be noted that, FIG. 5 only schematically illustrates a possible arrangement manner, quantity and shape of the concave portions 214, rather than further limitation of the design of the concave portions 214. In the embodiments of the present disclosure, the arrangement manner, quantity and shape of the concave portions 214 may be altered flexibly according to corresponding dimension design and structural requirement of the support portion 210.

Further, it can be seen from the above description, in order to overcome the downward/forward pitch tendency caused by the inner stress in the back shell, the entirety of the support member 20 should contact the back shell and then generate an upward and backward inner stress, that is, a rebound tendency opposite to the pitch tendency of the back shell.

Based this, the support portion 210 of the support member 20 may be achieved, for example, by the following manners.

Referring to FIG. 5, the support portion 210 further comprises a first lateral surface 216 away from the upper surface 110 (not shown), and the first lateral surface 216 intersects the second subarea 211b via a first edge (indicated by L0 in the drawing); the first lateral surface 216 comprises a first side (indicated by L1 in the drawing) and a second side (indicated by L2 in the figure) which are connected with the first edge L0, and the first side L1 and the second side L2 are arranged oppositely to each other. The support portion 210 further comprises a second side 217 intersecting the first lateral surface 216 and the second subarea 211b; the second side 217 comprises a third side (indicated by L3 in the drawings) arranged oppositely to the first side L1 of the first lateral surface 216; and the first side L1 is smaller than the second side L2, and the second side L2 is smaller than the third side L3, in such a way that it's possible to ensure the tilting direction and tilting angle of the second subarea with respect to the back shell even better, and thus to enable even better the control of the magnitude of the torsional stress.

Here the first lateral surface 216 and the second lateral surface 217 may be, for example, a flat surface shown in FIG. 5, may also be a curved surface or a concave surface, or an irregular flat surface or the like. Embodiments of the present disclosure are not limited thereto.

In such cases, before the second subarea 211b and the back shell are fixed through the second retainer portion 213, the gap angle between the second subarea 211b and the back shell is determined by the difference values between the three numeric L1, L2, and L3.

Based on the above embodiments, the second retainer portion 213 is provided to be adjacent to the first lateral surface 216, so that a greater torsional moment can be produced when the second subarea 211b and the back shell are fastened through the second retainer portion 213, so as to ensure that the entirety of the support member 20 has a sufficient rebound tendency opposite to the pitch tendency of the back shell.

Of course, as shown in FIG. 4, the support member 20 further comprises a support pole 220 and a connecting portion 230; the support pole 220 connects with the upper surface 110; and the connecting portion 230 is used to connect the support pole 220 with the support portion 210.

Further, for example, in order to achieve a steady connection between the support member and the upper surface 110 of the base 10, the support pole 220 is perpendicular to the upper surface 110.

Correspondingly, for example, in order to achieve an even more stable connection between the connecting portion 230 and the support portion 210, the connecting portion 230 is parallel with the upper surface 110.

Further, for example, in consideration of simplifying the process for manufacturing the support member 20, the support portion 210, the connecting portion 230 and the support pole 220 are formed as an integrated structure.

Based on the above embodiments, in order to fasten and support the back shell more steadily so that the entirety of the back shell bears a balance stress, referring to FIGS. 4 and 5, the support device 01 comprises two support members 20 arranged symmetrically. Each of the support members 20 has its second side L2 relatively closer to the second side L2 of the other support member, and each of the support members 20 has its first side L1 relatively further away from the first side L1 of the other support member. That is to say, the two support members 20 arranged oppositely to each other are in mirror symmetry with respect to each other. Typically, the first subareas 211a of the two support members 20 are symmetrical to each other, and similarly, the second subareas 211b of the two support members 20 are also provided to be mutually symmetrical.

Accordingly, in addition to creating a backward and upward rebound tendency upon the back shell, due to the case that the two support members 20 is in a mirror symmetry, each of the support members 20 also can slow down the ageing and inward sunk tendency of the materials caused by the inner stress concentration of the back shell.

Figure 6:
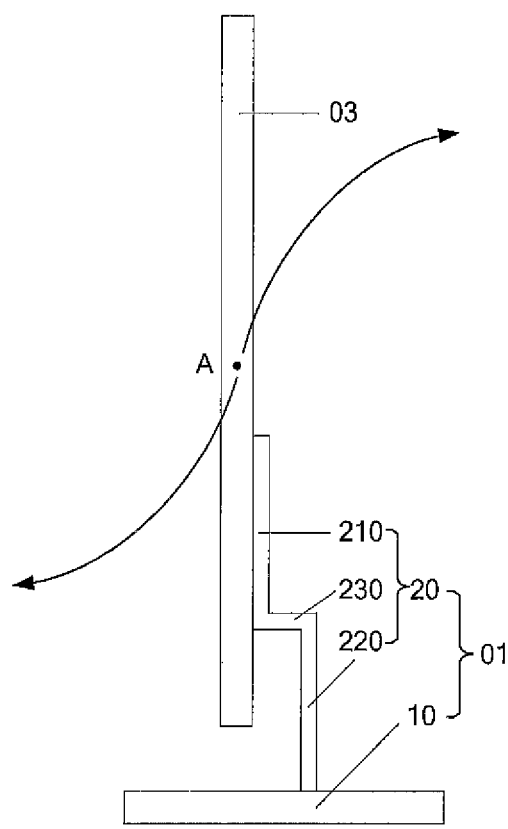
FIG. 6 is a structural schematic view of a display device provided by an embodiment of the present disclosure.

At least one embodiment of the present disclosure also provides a display device, as shown in FIG. 6, the display device comprises a back shell and the above-mentioned support device 01; and the back shell 03 comprises a first stopper portion corresponding to the first retainer portion of the support device 01 and a second stopper portion corresponding to the second retainer portion of the support device 01.

Herein, for example, the first stopper portion and the second stopper portion may be structures, such as stopper holes and the like, as long as they can fasten the back shell with the support device.

As shown in FIG. 6, when the second subarea 211b of the support device 01 is distorted through the second retainer portion 213 so as to contact the back shell 03 and to be fixed, the mass point A on the back shell 03 is subjected to an upward and backward inner stress (the direction of the stress is indicated by an arrow in a direction away from the back shell 03, as shown in the drawing), the direction of which is opposite to the direction of the downward/forward inner stress (as indicated by an arrow in a direction of the back shell 03), produced after life-time service, at the mass point A on the back shell 03, in such a way that the pitch tendency caused by the inner stress and ageing of the back shell after life-time service of the display device can be cancelled out, so as to maintain the mechanical balance of the entirety of the display device and thus prevent the entirety deformation of the large-sized and ultrathin display device.

The above-mentioned, display device may be typically a liquid crystal display, liquid crystal television, OLED display, OLED television, and so on.

It is to be noted that, all the drawings of the embodiments of the present disclosure are brief schematic views of the support device and the display device, merely for the purpose of clear description of structures, related to the inventive points, in the embodies, and other structures having no relation with the inventive points may employ known structures and are not or only partially shown in the drawings.

What are described above is related to the illustrative embodiments of the disclosure only and not limitative to the scope of the disclosure; the scopes of the disclosure are defined by the accompanying claims.

The present application claims the priority of the Chinese Patent Application No. 201420283006.X, filed on May 29, 2014, which is hereby entirely incorporated by reference as a part of the present application.

What is claimed is:

1. A support device for supporting a back shell, comprising:
   a base comprising an upper surface; and
   at least one support member disposed on the upper surface of the base, wherein the support member each at least comprises a support portion configured to contact the back shell to be supported, and the support portion comprises
   a contact surface facing the back shell, wherein the contact surface comprises a first subarea and a second subarea, the first subarea and the second subarea are in different planes, the first subarea is parallel with the back shell, the second subarea intersects the first subarea at a side of the first subarea, the side of the first subarea is away from the upper surface of the base, the second subarea and the first subarea forms an angle between them, and the second subarea obliquely extends in a direction away from the back shell; and
   a first retainer portion disposed at an intersection between the first subarea and the second subarea, and a second retainer portion disposed at the second subarea.

2. The support device according to claim 1, wherein the support portion further comprises:
   a plurality of concave portions disposed in the second subarea, wherein openings of the plurality of concave portions face the back shell; and
   a plurality of strengthening ribs joining adjacent concave portions.

3. A support device for supporting a back shell, comprising:
   a base comprising an upper surface; and
   at least one support member disposed on the upper surface of the base, wherein the support member each at least comprises a support portion configured to contact the back shell to be supported, and the support portion comprises
   a contact surface facing the back shell, wherein the contact surface comprises a first subarea and a second subarea, the first subarea and the second subarea are in different planes, the first subarea is parallel with the back shell, the second subarea intersects the first subarea at a side of the first subarea, the side of the first subarea is away from the upper surface of the base, the second subarea and the first subarea forms an angle between them, and the second subarea obliquely extends in a direction away from the back shell; and
   a first retainer portion disposed at an intersection between the first subarea and the second subarea, and a second retainer portion disposed at the second subarea;
   wherein the support portion further comprises a first lateral surface away from the upper surface, and the first lateral surface intersects the second subarea through a first edge;
   the first lateral surface comprises a first side and a second side which are connected with the first edge and opposite to each other; and
   the support portion further comprises a second lateral surface, which intersects the first lateral surface and the second subarea; and the second lateral surface comprises a third side opposite to the first side of the first lateral surface;
   wherein the first side is smaller than the second side, and the second side is smaller than the third side.

4. The support device according to claim 3, wherein the second retainer portion is provided to be adjacent to the first lateral surface.

5. The support device according to claim 1, wherein the first retainer portion comprises a first positioning hole and a first aligning member corresponding to the first positioning hole; and
   the second retainer portion comprises a second positioning hole and a second aligning member corresponding to the second positioning hole.

6. The support device according to claim 1, wherein the support member further comprises a support pole and a connecting portion;
   the support pole is connected with the upper surface; and
   the connecting portion connects the support pole and the support portion.

7. The support device according to claim 6, wherein the support pole is perpendicular to the upper surface.

8. The support device according to claim 6, wherein the connecting portion is parallel with the upper surface.

9. The support device according to claim 6, wherein the support portion, the connecting portion and the support pole are formed as an integrated structure.

10. The support device according to claim 3, wherein the support device comprises two support members arranged symmetrically;
    wherein second sides, which belong to the support members correspondingly, are relatively closer to each other, and first sides, which belong to the support members correspondingly, are relatively further away from each other.

11. A display device, comprising the back shell and the support device according to claim 1;
    wherein the back shell comprises a first stopper portion corresponding to the first retainer portion of the support device, and a second stopper portion corresponding to the second retainer portion of the support device.

12. The support device according to claim 2, wherein the first retainer portion comprises a first positioning hole and a first aligning member corresponding to the first positioning hole; and
the second retainer portion comprises a second positioning hole and a second aligning member corresponding to the second positioning hole.

13. The support device according to claim 3, wherein the first retainer portion comprises a first positioning hole and a first aligning member corresponding to the first positioning hole; and
the second retainer portion comprises a second positioning hole and a second aligning member corresponding to the second positioning hole.

14. The support device according to claim 4, wherein the first retainer portion comprises a first positioning hole and a first aligning member corresponding to the first positioning hole; and
the second retainer portion comprises a second positioning hole and a second aligning member corresponding to the second positioning hole.

15. The support device according to claim 2, wherein the support member further comprises a support pole and a connecting portion;
the support pole is connected with the upper surface; and
the connecting portion connects the support pole and the support portion.

16. The support device according to claim 3, wherein the support member further comprises a support pole and a connecting portion;
the support pole is connected with the upper surface; and
the connecting portion connects the support pole and the support portion.

17. The support device according to claim 4, wherein the support member further comprises a support pole and a connecting portion;
the support pole is connected with the upper surface; and
the connecting portion connects the support pole and the support portion.

18. The support device according to claim 5, wherein the support member further comprises a support pole and a connecting portion;
the support pole is connected with the upper surface; and
the connecting portion connects the support pole and the support portion.

19. The support device according to claim 12, wherein the support member further comprises a support pole and a connecting portion;
the support pole is connected with the upper surface; and
the connecting portion connects the support pole and the support portion.

20. The support device according to claim 13, wherein the support member further comprises a support pole and a connecting portion;
the support pole is connected with the upper surface; and
the connecting portion connects the support pole and the support portion.

* * * * *